April 6, 1943.   A. S. VAN HALTEREN ET AL   2,316,029
METHOD OF MAKING BRAKE DRUMS
Filed April 11, 1941   2 Sheets-Sheet 1

INVENTOR.
ANDREW S. VAN HALTEREN
and
BY CHARLES W. GRESSLE

April 6, 1943.   A. S. VAN HALTEREN ET AL   2,316,029
METHOD OF MAKING BRAKE DRUMS
Filed April 11, 1941   2 Sheets-Sheet 2
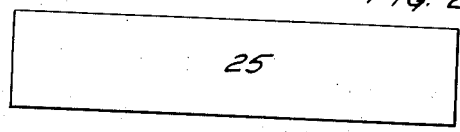
FIG. 2
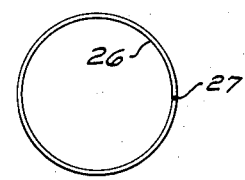
FIG. 4
FIG. 3
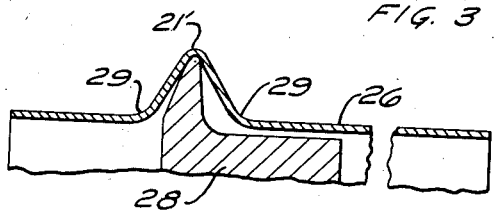
FIG. 5
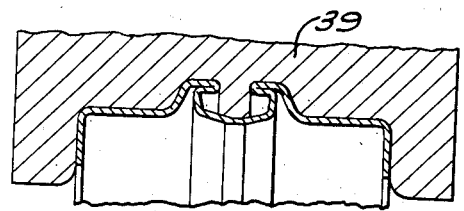
FIG. 10
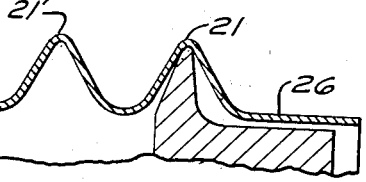
FIG. 6
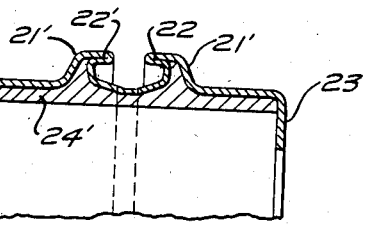
FIG. 11
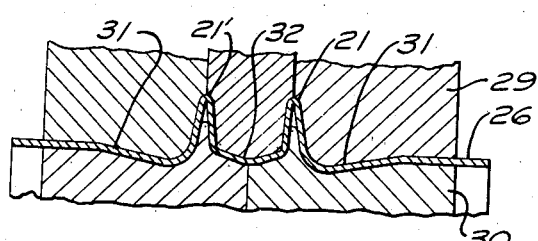
FIG. 7
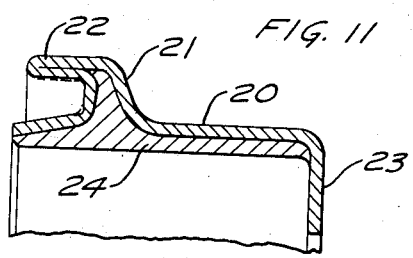
FIG. 12
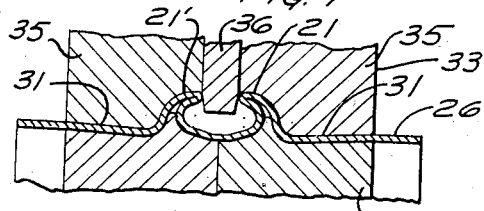
FIG. 8
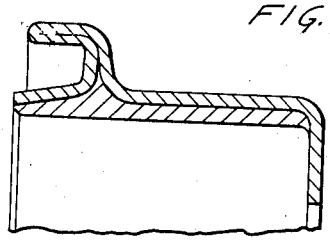
FIG. 13
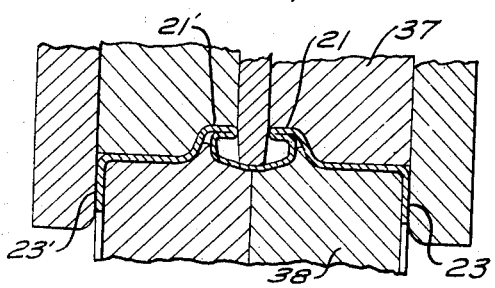
FIG. 9
INVENTOR.
ANDREW S. VAN HALTEREN
and
BY CHARLES W. GRESSLE
Carroll R. Taber Patented Apr. 6, 1943

2,316,029

UNITED STATES PATENT OFFICE 2,316,029

METHOD OF MAKING BRAKE DRUMS

Andrew S. Van Halteren, East Lansing, and Charles W. Gressle, Lansing, Mich., assignors to Motor Wheel Corporation, Lansing, Mich., a corporation of Michigan Application April 11, 1941, Serial No. 388,044

7 Claims. (Cl. 29—152.2)

This invention relates to methods of making brake drums. More particularly the invention relates to the method of making steel shells for brake rings to be lined with cast iron.

The brake rings of brake drums are subjected to relatively great pressures and high temperatures in service. Consequently, they tend to become distorted when the brake shoes are applied. The distortion may become permanent, that is, the brake rings do not resume their original shape when the pressure of the brake shoes is released and the temperature of the brake rings decreases.

The cast iron linings of brake rings of the type mentioned provide little resistance to such distortion. Hence the steel shells are principally relied upon to resist the tendency to deform. In order to stiffen these shells they are provided with annular ribs. The ribs usually are shaped to cooperate with the brake backing plate to provide a dust seal.

Previous methods of shaping the steel shells of brake rings have resulted in reducing the thickness of the metal of the rings in certain zones, which lowered the resistance to the forces tending to distort them. In addition, internal stresses were set up in the rings which increased the tendency for the rings to become deformed in service.

The principal object of this invention is to provide a method of making brake rings of the character referred to above which eliminates the thinning of the steel shell in the zones adjacent the stiffening ribs. This object is attained by gathering sufficient metal adjacent the base of the rib to prevent the thinning of the shell in that zone when the periphery of the rib is bent to the desired configuration required of it to form a seal in cooperation with the backing plate.

A secondary object of the invention is the provision of a method of making brake rings of the character referred to above which minimizes the tendency to permanent distortion during use. This object is attained by performing all shaping and sizing operations on the steel shell before applying the cast liner thereto. The heating of the shell during the application of the cast liner and the subsequent slow cooling thereof relieves internal stresses.

The foregoing and other objects of the invention will more fully appear in the following specification and accompanying drawings, wherein—

Figures 2 and 3 are side elevational and plan views respectively of a sheet metal blank from which the steel brake ring shell is fashioned;

Figure 4 is an end elevational view of the blank after it has been coiled into a hoop and the ends welded together;

Figures 5 to 10 are fragmentary cross-sectional views of the steel shell during different stages of its manufacture, the views also showing portions of the dies and rolls employed to shape the shell;

Figure 11 is a fragmentary cross-sectional view of the finished double ring shell, with the cast liner in place;

Figure 12 is a similar view of the finished brake ring; and

Figure 13 is a fragmentary cross-sectional view of a slightly modified form of finished brake ring which may be made by the process of this invention.

Figure 1:
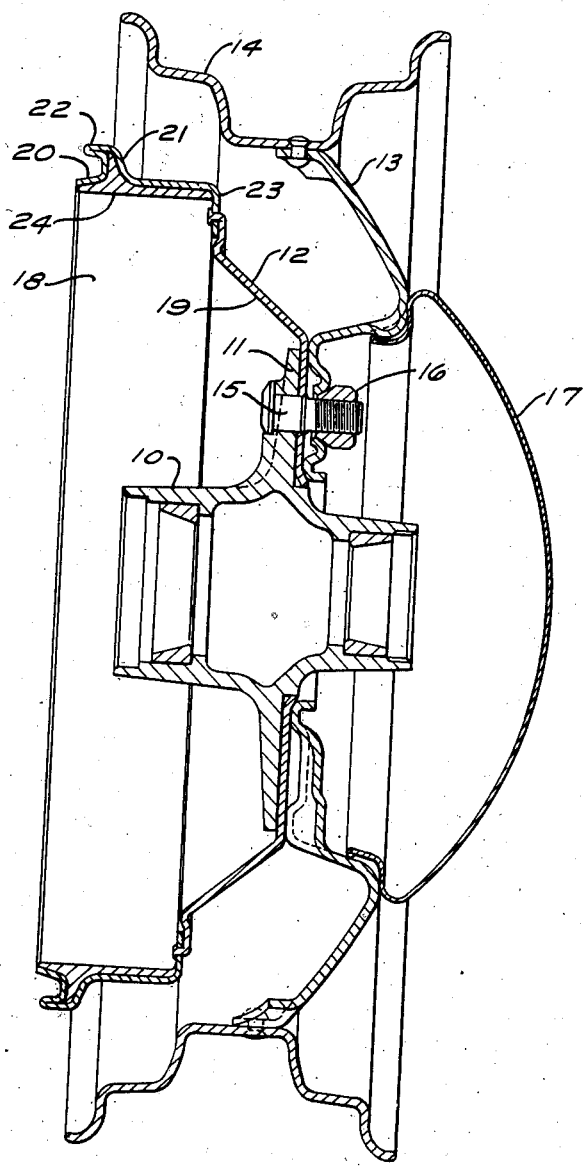
Figure 1 is a cross-sectional view of a wheel embodying a brake drum made by the process of the invention.

A completed brake drum made by the process of this invention is shown embodied in a wheel in Figure 1. The wheel comprises a hub 10 having a flange 11 to which the brake drum 12 is rigidly attached. A wheel body 13 to which a rim 14 is riveted is demountably secured to the hub flange 11 by stud bolts 15 and nuts 16. A hub cap 17 covers the central part of the wheel.

The brake drum 12 consists of a brake ring 18 and a brake drum back 19. The brake ring 18 comprises a steel shell 20 having an annular external rib 21 thereon. The base of rib 21 is hollow while the peripheral portion is bent over at 22 to form a dust seal adapted to cooperate with a brake backing plate (not shown) in the usual way. The brake ring is lined with cast iron 24 which is centrifugally cast therein. The iron fills the hollow base of the rib 22 and extends across the face of the ring. At the axially outer end of the brake ring is an inturned flange 23 to which the drum back is secured.

The steel shell 20 of the brake ring is formed from a flat sheet metal blank 25 shown in Figures 2 and 3. It is shaped in the manner illustrated in Figures 4 to 10. The blank 25 is a little more than twice the width necessary to make a complete ring and two rings are formed simultaneously from it.

The first step in forming the shell 20 is to coil it into a cylindrical hoop 26, shown in Figure 4. The ends of the blank are butt welded together at 27. The flash caused by welding is then trimmed from the joint.

Next a pair of external ribs 21 and 21' are formed on the hoop. Several distinct operations are performed in shaping the ribs, and these operations are shown in Figures 5 to 9. The purpose of these operations is to form the ribs accurately without thinning the metal of the shell in any particular zone.

In forming the ribs 21 and 21', the hoop 26 is placed upon an expanding die and expanded as shown in Figure 5. The die is a conventional expanding die comprising a plurality of radial sections 28, only one of which is shown. The sections are forced apart, stretching the metal of the hoop 26 between the points designated by the numerals 29 and partially shaping the rib 21'. At the same time that the metal of the hoop is stretched it is gathered, or in other words, the ends of the hoop are drawn toward each other. This compensates for the stretching and precludes the thinning of the metal in the rib portion.

After the operation shown in Figure 5, the radial sections 28 of the die are retracted, the hoop is repositioned relative to the die, and the die again expanded to partially form the other rib 21. See Figure 6. This results in a symmetrical hoop of metal having two spaced apart V-shaped ribs equi-distant from the ends of the hoop.

The hoop formed as in Figure 6 is then transferred to a rolling machine having a pair of forming rolls 29 and 30 thereon, only parts of which are shown. The hoop is rolled between the rolls 29 and 30 into the shape shown in Figure 7. During this operation the side walls of the ribs 21 and 21' are squeezed toward each other somewhat. At the same time the metal of the hoop 26 in the zones 31 is drawn radially inwardly, or shrunk. The ends of the hoop remain at their original diameter. The purpose of shrinking the hoop in the manner described is to gather the metal in zones 31 and thus provide material for the subsequent operations of shaping the ribs. The bottom of the gutter 32 between the ribs is formed during this operation also.

The hoop then goes to another rolling machine having a pair of rolls 33 and 34, where the peripheral portions of the ribs 21 and 21' are turned over toward each other. The metal in the zones 31 is pulled radially outwardly to a certain extent as the ribs are shaped. This is due to the fact that the outer walls of the ribs are of greater radius than the inner walls and more metal is required to form them. If that metal were not provided by shrinking the zones 31, the outer walls of the ribs would be thinned considerably.

It will be noted that roll 33 is made up of three parts, a pair of identical outer parts 35 and a central part 36. The part 36 extends between the ribs and maintains them a predetermined distance apart.

Figure 9 illustrates the next step of the process where the ribs are given their final shape. A pair of rolls 37 and 38 flatten the peripheral portions of the ribs. At the same time the portions 31 are returned to their original diameter. The ends of the hoop are turned in at right angles to provide the flanges 23 and 23'. This operation gives the final shape to the hoop.

It is desirable to accurately size the hoop and render it truly round. That is done in an upsetting die in the manner shown in Figure 10. The die comprises a plurality of radial sections 39 arranged in a circle. Only one section is shown. The hoop is placed between the sections and they are forced toward the center of the die, compressing or upsetting the hoop permanently. The hoop is thus accurately sized and rendered truly cylindrical.

The iron lining 24 is centrifugally cast into the ring in a way well known to the art. The flanges 23 and 23' form retaining walls for the molten metal which fills the hollow parts of the ribs 21 and 21' and extends from flange 23 to flange 23'.

After cooling, the hoop is cut apart along the broken lines 40, Figure 1, thereby forming two identical brake rings. The inner surface of the lining 24 is machined, completing the brake ring, as shown in Figure 1. It is then attached to the back in any suitable way.

The brake ring shown in Figure 13 differs from that shown in Figure 12 only in the shape of the base of the rib and the extent to which the cast iron enters the base of the rib. This brake ring may be made by the method just described in connection with the ring of Figure 12.

From the foregoing it will be apparent that the method herein disclosed of fashioning brake rings and brake ring shells is a definite improvement over any previous methods. As the process progresses, the metal of the hoop is gathered to provide for subsequent stretching, thereby avoiding any reduction in thickness of the metal in the shell. Furthermore, all shaping operations are performed prior to casting the lining. Internal stresses in the steel shell are relieved by the annealing of the shell when it is heated and slowly cooled during the casting process.

With the exception of the initial step of expanding the ribs, all shaping operations are performed by rolling. Rolling is a more accurate and more economical method of shaping hoops of the character described than pressing operations. Ordinary rolling operations would cause considerable thinning of the metal, but that reduction in metal thickness is obviated in the process disclosed.

One of the advantages resulting from the present method, which has not been previously mentioned, resides in the fact that by this method the reinforcing rib may be shaped to form an axially extending seal located between the lateral edges of the ring without the necessity of machining or cutting away any of the cast iron as would be necessary with prior methods. Thus, the present method makes possible the formation of such a brake ring without any waste of material.

The scope of the invention is indicated in the appended claims.

We claim:
1. The method of making brake rings for brake drums which comprises providing a cylindrical sheet metal hoop, forming an annular external rib in the hoop intermediate the ends thereof, shrinking the hoop in an annular zone intermediate one side of the rib and the adjacent end of the hoop, thereafter bending the peripheral portion of said rib radially inwardly and axially away from said zone and simultaneously stretching the hoop radially outwardly in said zone to provide for bending the rib.

2. The method of making brake rings for brake drums which comprises providing a cylindrical sheet metal hoop, forming a pair of axially spaced apart annular external ribs in the hoop intermediate the ends thereof, shrinking the hoop in annular zones intermediate the sides of the ribs remote from each other and the ends of the hoop, and thereafter bending the peripheral portions of said ribs toward each other and simultaneously stretching the hoop radially outwardly in the aforementioned zones to provide for bending the ribs.

3. The method of making brake rings for brake drums which comprises providing a cylindrical sheet metal hoop, stretching the hoop in two axially spaced apart annular zones intermediate the ends thereof to form a pair of hollow ribs, thereafter squeezing the side walls of each rib toward each other and simultaneously shrinking the hoop in annular zones adjacent the sides of the ribs remote from each other, and subsequently bending the peripheral portions of said ribs toward each other and simultaneously stretching the hoop radially outwardly in the last mentioned zones to provide for bending the ribs.

4. The method of making brake rings for brake drums which comprises providing a cylindrical sheet metal hoop, forming a pair of hollow annular external ribs intermediate the ends of the hoop, subsequently, entirely by rolling operations, squeezing the side walls of said ribs toward each other and simultaneously shrinking the hoop in annular zones adjacent the sides of the ribs remote from each other, and thereafter bending the peripheral portions of the ribs toward each other and simultaneously stretching the hoop radially outwardly in the aforementioned zones to provide for bending the ribs.

5. The method of making brake rings for brake drums which comprises providing a cylindrical sheet metal hoop, forming a pair of spaced apart annular external ribs intermediate the ends of the hoop, shrinking the hoop in annular zones adjacent the sides of the ribs remote from each other, thereafter bending the peripheral portions of the ribs toward each other and simultaneously stretching the hoop radially outwardly in the aforementioned zones to provide for bending the ribs, and thereafter casting a lining in said hoop.

6. The method of making brake rings for brake drums which comprises providing a cylindrical sheet metal hoop, forming an annular external rib in the hoop intermediate the ends thereof, shrinking the hoop in an annular zone intermediate one side of the rib and the adjacent end of the hoop, thereafter bending the peripheral portion of said rib radially inwardly and axially away from said zone and simultaneously stretching the hoop radially outwardly in said zone to provide for bending the rib, and finally casting a lining in said hoop.

7. The method of making brake rings for brake drums which comprises providing a cylindrical sheet metal hoop, forming a pair of spaced apart annular external ribs in the hoop intermediate the ends thereof, shrinking the hoop in annular zones adjacent the sides of the ribs remote from each other, thereafter bending the peripheral portions of the ribs toward each other and simultaneously stretching the hoop radially outwardly in the aforementioned zones to provide for bending the ribs, thereafter casting a lining in said hoop, and finally severing the hoop between said ribs to form two identical brake rings.

ANDREW S. VAN HALTEREN.
CHARLES W. GRESSLE.